US00RE35073E

United States Patent [19]

Dickey et al.

[11] E Patent Number: Re. 35,073

[45] Reissued Date of Patent: Oct. 31, 1995

[54] APPARATUS AND METHOD FOR REMOVING OIL SPOTS FROM A SURFACE

[75] Inventors: Maylon E. Dickey, Hayti, Mo.; Billy R. Dickey, Fort Meyers, Fla.

[73] Assignees: Gary N. Martin; Judy A. Wilkens, both of Aurora, Colo.

[21] Appl. No.: 935,653

[22] Filed: Aug. 26, 1992

Related U.S. Patent Documents

Reissue of:

[64] Patent No.: 4,947,940
Issued: Aug. 14, 1990
Appl. No.: 298,471
Filed: Jan. 18, 1989

U.S. Applications:

[63] Continuation of Ser. No. 726,580, Jul. 8, 1991, abandoned.

[51] Int. Cl.[6] ..... B08B 7/02

[52] U.S. Cl. ..... 134/6; 173/1; 173/48; 74/87; 404/133.1

[58] Field of Search ..... 173/49, 117, 1; 210/924; 134/7, 6; 74/87, 61; 404/113, 114, 133.05, 133.1, 133.2

[56] References Cited

U.S. PATENT DOCUMENTS

| | | | |
|---|---|---|---|
| 1,317,465 | 9/1919 | Turnbull | 404/133.05 X |
| 1,887,341 | 11/1932 | Venable | 404/133 X |
| 1,955,101 | 4/1934 | Sloan | 404/113 |
| 2,141,301 | 12/1938 | Jackson | 404/114 |
| 2,395,399 | 2/1946 | Davis | 404/113 |
| 2,400,341 | 5/1946 | Day et al. | 94/45 |
| 2,737,094 | 3/1956 | Jackson | 404/113 |
| 2,856,828 | 10/1958 | Brown et al. | 404/133 X |
| 2,894,435 | 7/1959 | Brown | 404/133 X |
| 3,339,422 | 9/1967 | Petrin | 74/87 |
| 3,342,118 | 9/1967 | Beierlein | 404/113 |
| 3,382,101 | 5/1968 | Bishop, Sr. | 134/7 |
| 3,396,805 | 8/1968 | Müller | 173/49 |
| 3,498,601 | 3/1970 | Koval | 74/61 X |
| 3,572,641 | 3/1971 | Peterson | 74/87 X |
| 3,604,520 | 9/1971 | Shatto, Jr. | 173/49 |
| 3,771,374 | 11/1973 | Choules | 74/87 |
| 3,814,533 | 6/1974 | Buck | 404/133 |
| 3,878,733 | 4/1975 | Tertinek | 404/133 X |
| 4,113,403 | 9/1978 | Tertinek et al. | 404/113 |
| 4,145,156 | 3/1979 | Grane | 404/117 X |
| 4,152,943 | 5/1979 | Wall | 74/61 X |
| 4,211,121 | 7/1980 | Brown | 74/87 |
| 4,401,475 | 8/1983 | Eriksson et al. | 134/6 |
| 4,412,757 | 11/1983 | Kümmel et al. | 404/117 X |
| 4,492,001 | 1/1985 | Hedrenius | 15/320 |

*Primary Examiner*—Rinaldi I. Rada
*Attorney, Agent, or Firm*—Senniger, Powers, Leavitt & Roedel

[57] ABSTRACT

A vibrator apparatus adapted for rubbing absorbent granules against a surface to remove oil spots therefrom. The apparatus comprises a platen having a generally flat lower face for engaging the surface, and a power driven shaft rotatably mounted on the platen and eccentrically weighted for vibrating the platen to rub the granules against the surface. The eccentrically weighted shaft comprises at least two eccentric weights mounted on the shaft and projecting radially therefrom at axially spaced locations. At least one of the eccentric weights is rotatable relative to the shaft to adjust the relative angular orientation of the eccentric weights and releasably lockable to the shaft, whereby adjustment of the relative angular orientations of the eccentric weights alters the vibrating motion of the platen. A method of removing oil spots with the vibrator apparatus is also disclosed.

4 Claims, 3 Drawing Sheets

APPARATUS AND METHOD FOR REMOVING OIL SPOTS FROM A SURFACE

Matter enclosed in heavy brackets [ ] appears in the original patent but forms no part of this reissue specification; matter printed in italics indicates the additions made by reissue.

*This is a continuation of reissue application Ser. No. 07/726, 580 filed on Jul. 8, 1991, now abandoned.*

BACKGROUND OF THE INVENTION

This invention relates generally to vibrators, and in particular to a vibrator apparatus and method for removing oil spots from a surface.

Puddles of oil, spilled on floors in garages and workshops from dripping automobiles and machinery are generally difficult to effectively remove. Presently, oil absorbing granules, such as Oil-Dry®, are widely used to remove such puddles. The granules are poured on an oil puddle and allowed to absorb the oil over a period of time. The granules and absorbed oil are then swept from the floor and discarded. However, a significant disadvantage of this method of removing oil is that a film of oil is not removed from the floor. Such film stains the floor and causes the floor to be slippery. Another disadvantage is that the granules are typically not saturated in the time given to absorb the oil. A user may have to wait an inordinate amount of time to remove the granules and absorbed oil if he waits for the granules to be completely saturated. Consequently, the user generally pours a large quantity of granules on the puddle than would be required if the granules were given time to be saturated. Thus, an excessive amount is needed to absorb the puddle.

SUMMARY OF THE INVENTION

Among the objects of the present invention may be noted the provision of a vibrator apparatus for removing oil from a surface; the provision of such an apparatus for moving oil absorbing granules over an oil spot; the provision of such an apparatus which increases the amount of oil absorbed by the granules; the provision of such an apparatus which vibrates the granules against the surface; the provision of such an apparatus in which the vibration is adjustable; and the provision of such an apparatus which is easy to operate and which is of relatively simple and inexpensive construction.

Generally, the vibrator apparatus of the present invention is adapted for rubbing absorbent granules against a surface, such as a concrete floor, to remove oil spots and the like from the surface. The apparatus comprises a platen having a generally flat lower face for engaging the surface, and means for vibrating the platen to rub the granules against the surface. The vibrating means comprises an eccentrically weighted shaft rotatably mounted on the platen and means for rotating the shaft to thereby cause vibration. The eccentrically weighted shaft comprises at least two eccentric weights mounted on the shaft and projected radially therefrom at axially spaced locations. At least one of the eccentric weights is rotatable relative to the shaft to adjust the relative angular orientation of the eccentric weights. The shaft further includes means for releasably locking the relatively rotatable eccentric weight(s) relative to the shaft, whereby adjustment of the relative angular orientations of the eccentric weights alters the vibrating motion of the platen.

In general, according to the method of the present invention, oil spots and the like are removed from a surface, such as a concrete floor. Absorbent granules are spread over an oil spot. A platen is then moved over the granules and vibrated by a power driven vibrating means whereby the granules are rubbed against the oil spot by the platen to absorb the oil and, thus, remove the spot.

These and other advantages will be in part apparent and in part pointed out hereinafter.

BRIEF DESCRIPTION OF THE DRAWINGS

Corresponding reference numerals indicate corresponding parts throughout the several views of the drawings.

DETAILED DESCRIPTION OF A PREFERRED EMBODIMENT

Figure 1:
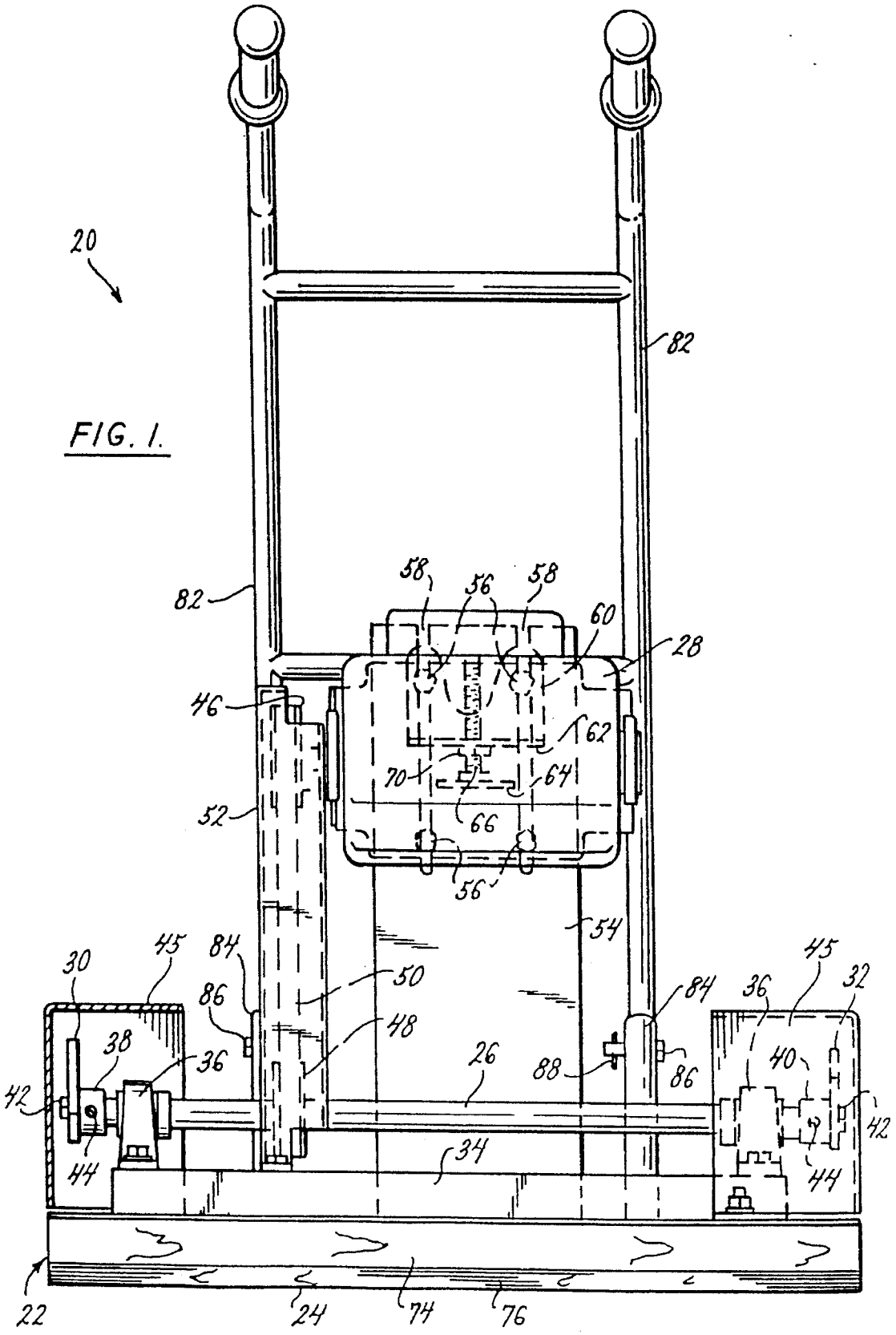
FIG. 1 is a rear elevation view of a vibrator apparatus of the present invention.

A vibrator apparatus, for rubbing absorbent granules against a surface, such as a concrete floor, to remove oil spots and the like from the surface, constructed according to the principles of this invention is indicated generally as 20 in FIG. 1. It comprises a platen 22 having a generally flat lower face 24 for engaging the surface. An eccentrically weighted shaft 26 is rotatably mounted on platen 22 and driven by an electric motor 28. Rotation of shaft 26 by motor 28 causes platen 22 to vibrate. Thus, shaft 26 and motor 28 constitute means for vibrating platen 22 to rub absorbent granules against the surface. Two eccentric weights 30 and 32, mounted on shaft 26 and projecting radially therefrom at axially spaced locations, are rotatable relative to shaft 26 to adjust the relative angular orientation of weights 30 and 32. As will be discussed below, weights 30 and 32 are releasably lockable to shaft 26 at incremental positions around the shaft whereby adjustment of the relative angular orientations of weights 30 and 32 alters the vibrating motion of platen 22.

Figures 2, 3:
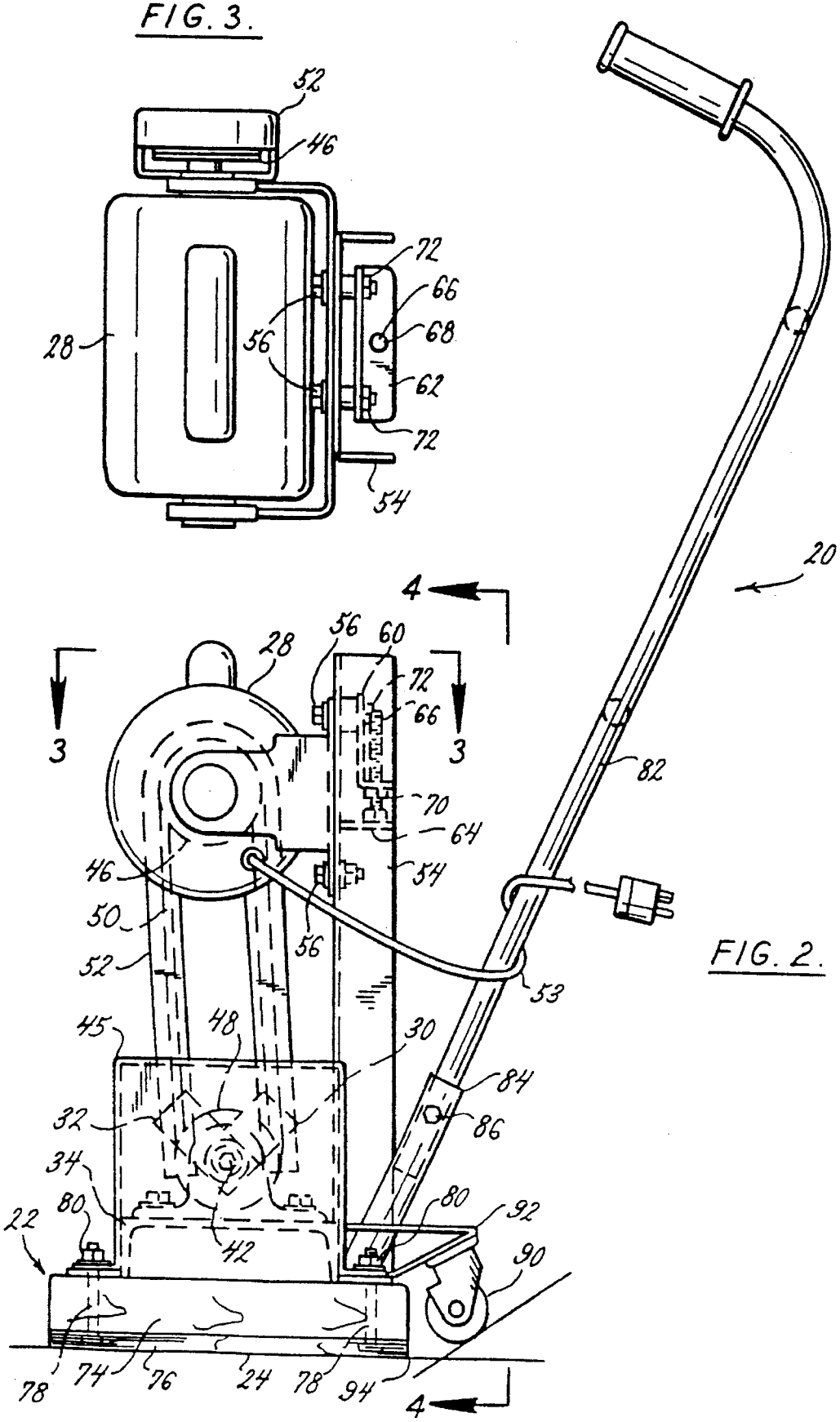
FIG. 2 is a side elevation view.
FIG. 3 is a plan view taken along line 3—3 of FIG. 2.
Figure 5:
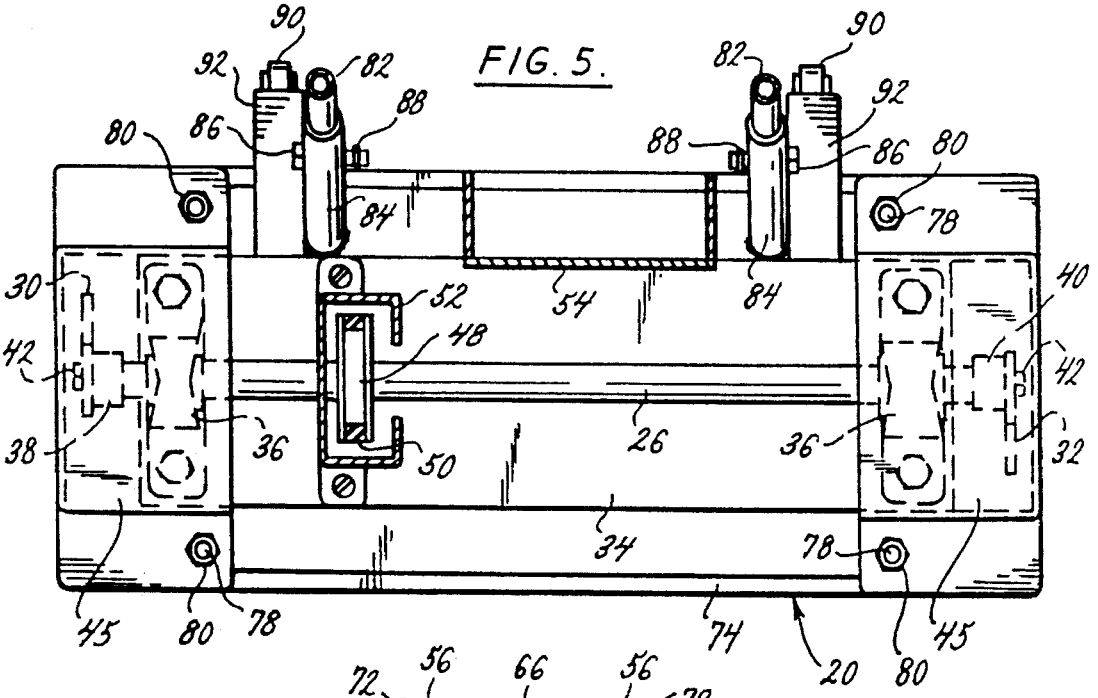
FIG. 5 is a cross-sectional view taken along line 5—5 of FIG. 4 showing the eccentrically weighted shaft.

As shown in FIGS. 1 and 2, shaft 26 is mounted on a channel 34, secured to the top face of platen 22, by roller bearings 36. Weights 30 and 32 are generally flat bars and are fixed to collars 38 and 40, respectively, which fit over opposite end portions of shaft 26. Screws 42 extend through weights 30 and 32 and are threaded axially into shaft 26 to secure weights 30 and 32 to shaft 26. Additionally, set screws 44 are threaded through collars 34 and 40 and engage shaft 26 to releasably lock weights 30 and 32 and collars 38 and 40 to shaft 26. Preferably, box-shaped guards 45 are positioned over weights 30 and 32 to protect the operator from the rotating weights 30 and 32. Loosening one of the set screws and turning the corresponding collar on shaft 26 changes the angular orientation of weight 30 relative to weight 32. The vibration characteristics imparted to platen 22 can be adjusted by varying the relative angular orientation of weights 30 and 32. As shown in FIG. 2, weights 30 and 32 are oriented approximately 90° with respect to each other. However, increasing or decreasing such orientation changes the vibration characteristics. For example, it is believed that the amplitude of vibration is maximized when weights 30 and 32 are oriented at 180° with respect to each other and that the amplitude is minimized when weights 30 and 32 are oriented at 0° with respect to each other. Thus, the vibration characteristics imparted to platen 22 can be adjusted to meet the requirements of the operator.

Shaft 26 is rotatably driven by motor 28. A drive pulley 46 of motor 28 is coupled to a pulley 48 secured to shaft 26 by a V-belt 50. Rotation of pulley 46 rotates pulley 48 and shaft 26. Preferably, a belt guard 52 is positioned around V-belt 50 to prevent injury to the operator. A power cord 53, adapted to plug into an electric outlet, extends from motor 28.

Figure 4:
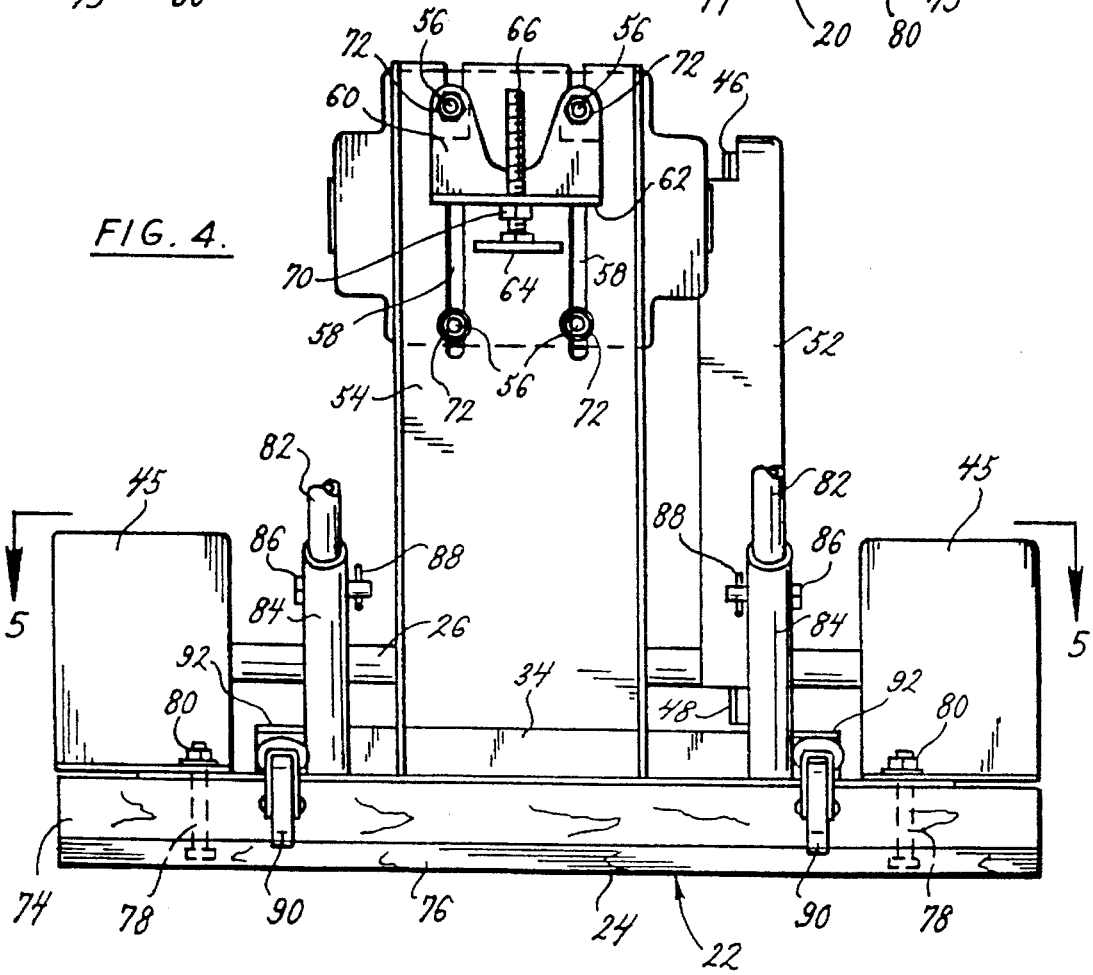
FIG. 4 is a front elevation view taken along line 4—4 of FIG. 2.

Motor 28 is adjustably mounted on a motor support member 54 which extends upwardly from channel 34. As shown in FIGS. 3 and 4, four bolts 56 extend horizontally from motor 28 and through vertical slots 58 in support member 54. Two of the bolts 56 also extend through a motor adjustment bracket 60. Bolts 56 are adapted for riding along slots 58 as the position of motor 28 is adjusted up or down to vary the tension on belt 50. A flange 62 extends horizontally from the lower edge of bracket 60. A flat plate 64, positioned below flange 62, is welded to and extends horizontally from support member 54. An adjustment bolt 66 is welded to plate 64 and extends upwardly through an aperture 68 in flange 62. A nut 70, fastened onto bolt 66, abuts the lower face of flange 62 to prevent bracket 60 and motor 28 from moving downwardly with respect to support member 54. Turning nut 70 changes the heightwise position of motor 28 with respect to support member 54 so that the tension in belt 50 can be adjusted. After the desired tension of belt 50 is reached, nuts 72 can be tightened on bolts 56 to lock motor 28 against support member 54.

Platen 22 comprises superposed upper and lower members 74 and 76, preferably made of wood. Members 74 and 76 are releasably secured together and connected to channel 34 by bolts 78 extending through members 74 and 76 and threaded into corresponding nuts 80. If lower member 76 wears excessively or is damaged, then it can be replaced by a new member.

A handle structure 82 extends generally upwardly from platen 22 to enable an operator to move apparatus 20 over the surface. Sleeves 48 extend generally upwardly from and are secured to channel 34. The lower portions of handle structure 82 are releasably connected to sleeves 84 by bolts 86 and corresponding cotter pins 88. Thus, handle structure 82 can be disconnected from sleeves 84 for storage. Casters 90, constituting roller means, are connected to channel 34 by supports 92. They are positioned adjacent an edge 94 of platen 22 and generally above the lower face 24 of platen 22 so that tilting apparatus 20 toward the edge causes the casters 90 to contact the surface and elevate lower face 24 above the surface of enabling apparatus 20 to roll. Thus, casters 90 are engageable with the surface to transport apparatus 20. However, when the lower face 24 abuts the surface, i.e., during operation of apparatus 20, casters 90 are positioned above and not in contact with the surface.

In operation, absorbent granules are spread over an oil spot on the surface. Platen 22 is then moved over the granules and vibrated to rub the granules against the oil spot to absorb the oil. The vibration of platen 22 causes the granules to move about the oil spot to more effectively absorb the oil. The vibration also compresses and then releases the granules. Such compression and release increases the rate and effectiveness of absorption just as compression and release of a sponge increases its rate and effectiveness of absorption. Thus, vibration of platen 22 causes the granules to absorb more oil. Further, the platen 22 rubbing the granules abrades the surface to remove oil residue or stains. Accordingly, apparatus 20 is easy to operate and is of relatively simple and inexpensive construction.

In view of the above, it will be seen that the several objects of the invention are achieved and other advantageous results attained.

As various changes could be made in the above constructions and method without departing from the scope of the invention, it is intended that all matter contained in the above description or shown in the accompanying drawings shall be interpreted as illustrative and not in a limiting sense.

What is claimed is:

[1. A vibrator apparatus adapted for rubbing absorbent granules against a surface, such as a concrete floor, to remove oil spots and the like from the surface, the apparatus comprising a platen having a generally flat lower face for engaging the surface, roller means mounted on the platen, and means for vibrating the platen to rub the granules against the surface, the roller means being positioned adjacent an edge of the platen and generally above the lower face so that tilting the apparatus toward said edge causes the roller means to contact the surface and elevate the lower face above the surface for enabling the apparatus to roll, the vibrating means comprising an eccentrically weighted shaft rotatably mounted on the platen and means for rotating the eccentrically weighted shaft to cause the platen to vibrate, the eccentrically weighted shaft comprising at least two eccentric weights mounted on the shaft and projecting radially therefrom at axially spaced locations, at least one of the eccentric weights being rotatable relative to the shaft to adjust the relative angular orientation of the eccentric weights, and means for releasably locking the relatively rotatable eccentric weight relative to the shaft at incremental positions around the shaft, whereby adjustment of the relative angular orientations of the eccentric weights alters the vibrating motion of the platen.]

[2. The apparatus according to claim 1 wherein the means for rotating the shaft comprises an electric motor coupled to the shaft.]

[3. The apparatus according to claim 2 further comprising a handle connected to the platen and extending upwardly to enable a user to move the apparatus over the surface.]

[4. A vibrator apparatus adapted for rubbing absorbent granules against a surface, such as a concrete floor, to remove oil spots and the like from the surface, the apparatus comprising a platen having a generally flat lower face for engaging the surface, and means for vibrating the platen to rub the granules against the surface, said platen comprising superposed upper and lower members releasably secured to one another, said vibrating means comprising an eccentrically weighted shaft rotatably mounted on the platen and means for rotating the eccentrically weighted shaft to cause the platen to vibrate, the eccentrically weighted shaft comprising at least two eccentric weights mounted on the shaft and projecting radially therefrom at axially spaced locations, at least one of the eccentric weights being rotatable relative to the shaft to adjust the relative angular orientation of the eccentric weights, and means for releasably locking the relative rotatable eccentric weight relative to the shaft at incremental positions around the shaft, whereby adjustment of the relative angular orientations of the eccentric weights alters the vibrating motion of the platen.]

[5. The apparatus according to claim 4 wherein the lower member is formed of wood.]

[6. A vibrator apparatus adapted for rubbing absorbent granules against a surface, such as a concrete floor, to remove oil spots and the like from the surface, the apparatus comprising a platen having a generally flat lower face for engaging the surface, and means for vibrating the platen to rub the granules against the surface, said vibrating means comprising an eccentrically weighted shaft rotatably mounted on the platen and means for rotating the eccentrically weighted shaft to cause the platen to vibrate, the eccentrically weighted shaft comprising two eccentric weights mounted adjacent opposite ends of the shaft and projecting radially of the shaft, at least one of the eccentric weights being rotatable relative to the shaft to adjust the relative angular orientation of the eccentric weights with respect to each other, and means for releasably locking the relatively rotatable eccentric weight relative to the shaft at incremental positions around the shaft, whereby adjustment of the relative angular orientations of the eccentric weights alters the vibrating motion of the platen.]

*7. A method of removing oil spots from a concrete surface with power driven vibrator apparatus having a platen with a releasably secured lower member of wood, comprising the steps of:*

*spreading granular material which is absorbent and abrasive over an oil spot;*

*placing the platen over the granular material;*

*vibrating the platen to repetitively compress and release the granules so that the granular material is rubbed against the oil spot by the lower member of the platen to abrade the oil spot and absorb the oil and wear away the lower wood member; and*

*removing the granular material from the cleaned concrete surface.*

*8. A method of removing oil spots from a concrete surface with vibrator apparatus having a power driven eccentrically weighted rotatable shaft mounted on a platen with a releasably secured lower member of wood, comprising the steps of:*

*spreading absorbent and abrasive granules over an oil spot;*

*placing the platen over the absorbent granules;*

*rotating the eccentrically weighted shaft to vibrate the platen so that the absorbent and abrasive granules are rubbed against the oil spot by the lower wood member of the platen to absorb the oil and wear away the lower wood member;*

*removing the granular material from the cleaned surface;*

*removing the lower member from the platen when the wear becomes excessive; and*

*securing a replacement lower wood member thereto.*

*9. The method of claim 8 wherein the step of rotating the eccentrically weighted shaft comprises rotating the shaft and two eccentric weights mounted on the shaft and projecting radially therefrom at axially spaced locations.*

*10. The method of claim 9 further comprising the step of adjusting the relative angular orientation of the eccentric weights to alter the vibrating motion of the platen.*

* * * * *